United States Patent [19]
Ueda et al.

[11] Patent Number: 5,624,756
[45] Date of Patent: Apr. 29, 1997

[54] DIAMOND-BASED ULTRA-HIGH-PRESSURE-SINTERED MATERIAL HAVING EXCELLENT CHIPPING RESISTANCE, CUTTING TOOL MADE THEREFROM, AND METHOD OF MANUFACTURING THE CUTTING TOOL

[75] Inventors: Fumihiro Ueda; Tadakazu Oohashi, both of Omiya, Japan

[73] Assignee: Mitsubishi Materials Corporation, Tokyo, Japan

[21] Appl. No.: 361,386

[22] Filed: Dec. 22, 1994

[30] Foreign Application Priority Data

Dec. 24, 1993 [JP] Japan .................................. 5-348131

[51] Int. Cl.$^6$ ............................ B23P 15/28; C04B 35/52
[52] U.S. Cl. ............................ 51/309; 428/701; 428/702; 428/408; 51/307; 156/89; 407/119; 264/43
[58] Field of Search ............................ 428/408, 701, 428/702; 51/307, 309; 407/119; 264/56, 41; 156/89

[56] References Cited

U.S. PATENT DOCUMENTS 3,894,850  7/1975  Kovalchuk et al. ............... 51/307
5,270,114  12/1993  Herb et al. ...................... 428/408

Primary Examiner—Archene Turner
Attorney, Agent, or Firm—Oblon, Spivak, McClelland, Maier & Neustadt, P.C.

[57] ABSTRACT

A cutting tool blank formed of material having a composition comprising of 0.1 to 20 wt % of $BaCO_3$ and/or $MgCO_3$, and/or 0.05 to 10 wt % of $CaMg(CO_3)_2$ or $CaCO3$, the balance being preferably substantially diamond forming a matrix is heated and maintained at a temperature of 800° to 1400° C. in a vacuum to change, by chemical reaction, the above $BaCO_3$ and/or $MgCO_3$, and/or $CaMg(CO_3)_2$ or $CaCO_3$ into 0.05 to 13% of BaO and/or MgO and/or 0.02 to 5% of CaO, and to form pores. In this manner, a cutting tool formed of a diamond-based ultra-high-temperature-sintered material having a structure in which BaO, MgO and/or CaO are distributed finely and uniformly in a diamond matrix is obtained.

8 Claims, 1 Drawing Sheet

5,624,756

DIAMOND-BASED ULTRA-HIGH-PRESSURE-SINTERED MATERIAL HAVING EXCELLENT CHIPPING RESISTANCE, CUTTING TOOL MADE THEREFROM, AND METHOD OF MANUFACTURING THE CUTTING TOOL

FIELD OF THE INVENTION

The present invention relates to a diamond-based ultra-high-pressure-sintered material, and to a cutting tool made therefrom, in which the propagation of cracks is limited, it is thought, by pores which are distributed throughout. The invention also relates to methods of manufacturing the diamond-based material and cutting tool.

BACKGROUND OF THE INVENTION

Cutting tools formed of a diamond-based ultra-high-pressure-sintered material having a composition consisting essentially of 0.1 to 15 wt % of at least one of barium carbonate (hereinafter $BaCO_3$) and magnesium carbonate (hereinafter $MgCO_3$), the balance being a diamond forming matrix and having a structure wherein the above-mentioned content of at least one of $BaCO_3$ and $MgCO_3$ is distributed finely and uniformly in the diamond matrix and having a theoretical density higher than 99% have been used for the finish-cutting of, for example, WC-based cemented carbides or Ti alloys.

However, in view of the strong demand for a reduction in the amount of labor necessary for cutting work as well as the ever-present need for increased production, cutting speed is ever increasing. Unfortunately, in finish-cutting, for example, Ti alloys or WC-based cemented carbides using a cutting tool made from the above-described diamond-based ultra-high-pressure-sintered material at high speed, chipping (small breaks) occurs quickly and at the cutting edge, making the usable life of the tool comparatively short.

OBJECTS OF THE INVENTION

In view of the above situation the inventors set out to improve the chipping resistance of diamond-based cutting tools, and have discovered that when a material like the above-described diamond-based ultra-high-pressure-sintered material undergoes further heating in a vacuum or in a pressure-reduced atmosphere at a temperature of 800° to 1400° C. (preferably 1000° to 1400° C.) that any $BaCO_3$, $MgCO_3$, $CaMg(CO_3)_2$ (a composite carbonate of calcium and magnesium), and calcium carbonate (hereinafter $CaCO_3$) present therein change into oxides; i.e., barium oxide (hereinafter BaO), magnesium oxide (hereinafter MgO) and calcium oxide (hereinafter CaO) by chemical reaction, and that fine pores are formed in the material simultaneously. As a result of this pore formation, a theoretical density percentage of from 96 to 99.5% is reached. Cutting tools formed from the resulting diamond-based ultra-high-pressure-sintered material have remarkably improved chipping resistance because, it is thought, the propagation of cracks generated during cutting is limited by the pores distributed throughout the diamond matrix and by the BaO, MgO and/or CaO since these oxides have a hardness which larger than that of the corresponding carbonates. Improvement in the wear resistance of the diamond matrix is also obtained.

It was also discovered that a certain amount of unchanged carbonates may remain in the matrix as long as the amount is so small that the features of the present invention (reduced chipping, increased wear life, etc.) are not impaired.

DETAILED DESCRIPTION OF THE PRESENT INVENTION

Figure 1:
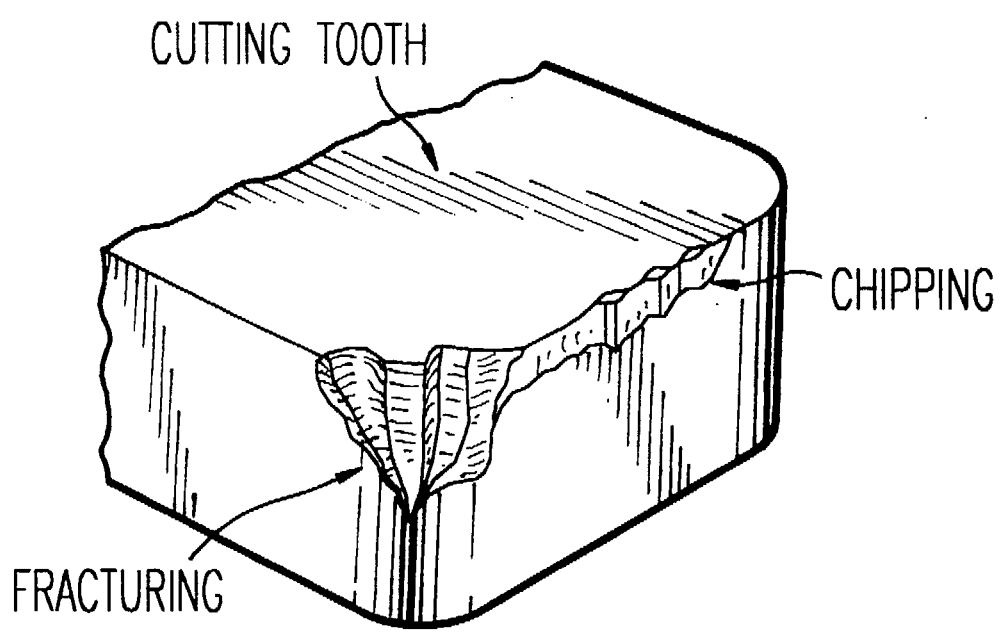
FIG. 1 shows the chipping and fracturing of a cutting tool edge.

The present invention has been completed in part on the basis of the above-described discovery and is characterized by (1) a cutting tool made of a diamond-based ultra-high-pressure-sintered material having excellent chipping resistance, the material having a composition comprising of 0.05 to 13% of BaO and/or MgO, and/or 0.02 to 5 wt % of CaO, the balance being diamond forming a matrix, the material having a structure wherein pores and the above-mentioned contents of BaO, MgO and/or CaO are distributed (preferably uniformly) within the diamond matrix, the material further having a theoretical density percentage of from about 96 to about 99.5%, and (2) a method of manufacturing a cutting tool made of the diamond-based ultra-high-pressure-sintered material having excellent chipping resistance described above in (1), the method comprising the steps of:

preparing a cutting tool blank of a material having a composition comprising of 0.1 to 20 wt % of $BaCO_3$ and/or $MgCO_3$, and/or 0.05 to 10 wt % Of $CaMg(CO_3)_2$ or $CaCO_3$, the balance being diamond forming a matrix, the blank material having a structure in which $BaCO_3$ and/or $MgCO_3$, and/or $CaMg(CO_3)_2$ or $CaCO_3$ are distributed uniformly throughout the diamond matrix, the blank material having a theoretical density percentage higher than 99.5%; and heating and maintaining the cutting tool blank at a temperature of 1000° to 1400° C. in a vacuum or a pressure-reduced atmosphere so that some or all of the carbonates in the matrix are changed into oxides by chemical reaction, and so that pores distributed throughout the matrix are formed.

The diamond-based material and cutting tool of the present invention will next be further described.

(a) Contents of Oxides and/or and Carbonates, and Theoretical Density Percentage An oxide content of BaO and/or MgO smaller than 0.05% in the sintered and heated diamond-based material and cutting tool of the present invention corresponds to a carbonate content smaller than 0.1% in the blank. If the total content of carbonates is smaller than 0.1%, the binding of diamond powder particles when the blank is sintered is not satisfactorily obtained, and the amount of pores formed by heating is too small. As a result, the theoretical density percentage obtained is excessively high, i.e., higher than 99.5%, and the desired effect of improving chipping resistance is not achieved. On the other hand, a total content of oxides larger than 13% in the blank corresponds to a carbonate content larger than 20% in the blank. In this case, pores are excessively formed at the time of heating so that the theoretical density percentage obtained is smaller than 96%; that is, the reduction in density is considerable. Moreover, the wear resistance of the diamond matrix and cutting tool is considerably reduced. The same result is also exhibited if the theoretical density percentage of the cutting tool blank is smaller than 99.5%.

If the content of carbonates is particularly high, it is impossible to ensure a theoretical density percentage of 99.5% in the cutting tool. For these reasons, the content of oxides in the cutting tool is preferably within the range of 0.05 to 13%, the theoretical density percentage of the cutting tool is preferably within the range of 96 to 99.5%, the content of carbonates in the cutting tool blank is preferably within the range of 0.1 to 20%, and the theoretical density percentage of the cutting tool blank (before heating) is preferably 99.5% or higher.

(Cao)

CaO may optionally coexist in the invention diamond matrix and cutting tool with BaO and/or MgO and has the effect of further strengthening binding between diamond particles. It may be added as CaO, $CaCO_3$, $CaMg(CO_3)_2$, etc. or a mixture thereof. However, if the content of CaO is smaller than 0.02%, this effect is not exhibited. If the content of CaO is higher than about 5% the high-temperature stability of the sintered body is reduced.

For this reason, the content of CaO in the invention diamond matrix and cutting tool is preferably within the range of 0.02 to 5%, the theoretical density percentage of the cutting tool is preferably within the range of 96 to 99.5%, and the content of calcium-containing carbonates in the cutting tool material before heating is preferably within the range of 0.05 to 10 wt %.

The oxides and/or carbonates present in the invention diamond matrix and cutting tool are preferably distributed therethroughout.

(b) Heating Temperature

If the heating temperature of the diamond matrix described above is lower than 800° C., the extent of chemical reaction for changing the carbonates into oxides is not sufficiently attained. If the heating temperature is higher than 1400° C., the matrix diamond reacts with the formed oxides. Therefore, the heating temperature is preferably within the range of 800° to 1400° C. At heating temperatures lower than 1000° C., there is a possibility that part of carbonates will remain. However, sufficient chipping resistance is obtained in the case of heating at 800° C. or higher.

The preferred pressures used for the heat treatment range from $1 \times 10^{-8}$ to $1 \times 10^{-2}$ mmHg, preferably $1 \times 10^{-5} - 1 \times 10^{-3}$ mmHg. Heating can be accomplished in air, oxygen, nitrogen, etc. at these pressures. The temperature can be raised at any rate, preferably from 1°–20° C. per minute.

The present invention will now be further explained by means of examples. The invention is not limited to the examples, however.

First, twenty cutting tool blanks having a diameter of 7 mm, a thickness of 1 mm, and follow of diamond-based ultra-high-temperature-sintered materials having compositions and theoretical density percentages as shown in Table 1 (each having a structure in which any $BaCO_3$, $MgCO_3$, $CaMg(CO_3)_2$ or $CaCO_3$ are distributed uniformly throughout the diamond matrix) were prepared with a belt-type ultra-high-pressure-sintered furnace. See Japanese Patent Laid-Open Publication No. 74766/1092, incorporated herein by reference. These cutting tool blanks were then processed by heat treatment under conditions shogun in Table 1, and cutting chips in accordance with TNCA332 were obtained from the process blanks by machining. In this manner, cutting tools 1 to 20 made of diamond-based ultra-high-temperature-sintered materials and having compositions and theoretical density percentages shown in Table 2 (and having a structure in which any BaO, MgO and CaO are distributed uniformly in the diamond matrix, hereinafter referred to as "invention cutting tools") were manufactured.

For the purpose of comparison, conventional cutting tools made of diamond-based ultra-high-temperature-sintered materials (hereinafter referred to as "conventional cutting tools") were manufactured from the above-mentioned 20 cutting tool blanks by machining cutting chips but without heating the blanks. Comparative cutting tools were also made according to the invention method but having different amounts of oxides, density values, etc. See Table 3.

The various cutting tools thus obtained were brazed to WC-based cemented carbide bases (containing 6% Co) and were subjected to testing by cutting a Ti alloy at high speed in a continuous dry cutting manner under the following conditions:

member to be cut: a round bar formed of a Ti alloy having a composition of: Ti with 6% Al and 4% V, cutting speed: 300 m/min., feed: 0.1 mm/rev., and cutting time: 30 min.

Thereafter, the flank width of each cutting edge was measured. Table 2 shows the result of this measurement.

As is apparent from the results shown in Tables 1 and 2, the invention cutting tools 1 to 20 were free from chipping in their cutting edge and exhibited improved wear resistance even during high-speed finish-cutting of a hard material like a Ti alloy with which cracks can occur easily, particularly, it is thought, because the propagation of cracks generated during cutting was limited by the pores distributed in the invention diamond matrix. In contrast, conventional cutting tools 1 to 10 and the comparative cutting tools 1 to 10 showed chipping after the start of cutting so that the operating life was comparatively short.

According to the present invention, as described above, a material and cutting tool made of a diamond-based ultra-high-temperature-sintered material having excellent chipping resistance is provided. The diamond-based material and cutting tool of the present invention are free from chipping and can exhibit improved cutting performance over a long period of time even if the cutting tool is used for the high-speed cutting of a hard material such as a Ti alloy or a WC cemented carbide with which chipping can occur easily. Thus, the invention contributes to labor-saving cutting work.

This application is based on Japan HEI 5-348131 filed Dec. 24, 1993, incorporated herein by reference. Obviously, numerous modifications and variations are possible in light of the above teachings. It is therefore understood that within the scope of the appended claims, the invention may be practiced otherwise than as specifically described herein.

TABLE 1

| samples | composition (wt. %) | | | | | relative density | heat treatment condition | | | |
|---|---|---|---|---|---|---|---|---|---|---|
| | BaCO$_3$ | MgCO$_3$ | CaCO$_3$ | CaMg(CO$_3$)$_2$ | diamond | | pressure (mmHg) | heating rate (°C./min.) | temperature (°C.) | time (min.) |
| this invention | | | | | | | | | | |
| 1 | 0.13 | — | — | — | bal. | 99.7 | 5 × 10$^{-4}$ | 10 | 1200 | 20 |
| 2 | 5.2 | — | — | — | bal. | 99.8 | 1 × 10$^{-4}$ | 8 | 1300 | 15 |
| 3 | 10.2 | — | — | — | bal. | 99.8 | 5 × 10$^{-5}$ | 5 | 1000 | 30 |
| 4 | 15.0 | — | — | — | bal. | 99.9 | 5 × 10$^{-5}$ | 5 | 1100 | 15 |
| 5 | — | 0.12 | — | — | bal. | 99.6 | 5 × 10$^{-5}$ | 6 | 1400 | 10 |
| 6 | — | 6.4 | — | — | bal. | 99.9 | 1 × 10$^{-5}$ | 5 | 1200 | 20 |
| 7 | — | 9.7 | — | — | bal. | 99.9 | 1 × 10$^{-5}$ | 4 | 1100 | 30 |
| 8 | — | 19.7 | — | — | bal. | 99.9 | 1 × 10$^{-4}$ | 6 | 900 | 60 |
| 9 | 2.5 | 10.2 | — | — | bal. | 99.7 | 1 × 10$^{-4}$ | 8 | 800 | 30 |
| 10 | 2.5 | 6.0 | — | — | bal. | 99.8 | 5 × 10$^{-4}$ | 10 | 950 | 10 |
| 11 | 0.15 | — | 0.08 | — | bal. | 99.7 | 5 × 10$^{-4}$ | 8 | 1100 | 30 |
| 12 | 5.5 | — | 4.2 | — | bal. | 99.6 | 5 × 10$^{-5}$ | 6 | 1000 | 40 |
| 13 | 9.3 | — | — | 0.12 | bal. | 99.8 | 5 × 10$^{-5}$ | 10 | 1300 | 60 |
| 14 | — | 16.5 | — | 3.8 | bal. | 99.8 | 5 × 10$^{-4}$ | 9 | 800 | 60 |
| 15 | — | 0.18 | 0.5 | — | bal. | 99.9 | 5 × 10$^{-4}$ | 8 | 1200 | 30 |
| 16 | — | 7.5 | 2.7 | — | bal. | 99.7 | 1 × 10$^{-4}$ | 8 | 1100 | 50 |
| 17 | — | 12.5 | — | 0.38 | bal. | 99.9 | 1 × 10$^{-4}$ | 7 | 1300 | 60 |
| 18 | — | 15.0 | — | 4.8 | bal. | 99.9 | 5 × 10$^{-5}$ | 9 | 850 | 60 |
| 19 | 1.2 | 15.2 | 1.0 | — | bal. | 99.7 | 5 × 10$^{-5}$ | 10 | 1200 | 30 |
| 20 | 2.7 | 8.0 | — | 3.9 | bal. | 99.6 | 1 × 10$^{-5}$ | 10 | 850 | 50 |

TABLE 2

| samples | cutting tool material | | | | | | | | relative density (%) | flank wear width (mm) |
|---|---|---|---|---|---|---|---|---|---|---|
| | composition (wt. %) | | | | | | | | | |
| | BaO | MgO | CaO | BaCO$_3$ | MgCO$_3$ | CaCO$_3$ | CaMg(CO$_3$)$_2$ | diamond | | |
| this invention | | | | | | | | | | |
| 1 | 0.1 | — | — | — | — | — | — | bal. | 99.5 | 0.20 |
| 2 | 4.0 | — | — | — | — | — | — | bal. | 97.6 | 0.16 |
| 3 | 7.9 | — | — | — | — | — | — | bal. | 96.9 | 0.15 |
| 4 | 11.7 | — | — | — | — | — | — | bal. | 96.2 | 0.18 |
| 5 | — | 0.06 | — | — | — | — | — | bal. | 99.3 | 0.14 |
| 6 | — | 3.1 | — | — | — | — | — | bal. | 97.9 | 0.13 |
| 7 | — | 4.6 | — | — | — | — | — | bal. | 97.1 | 0.12 |
| 8 | — | 7.3 | — | — | 4.1 | — | — | bal. | 96.6 | 0.13 |
| 9 | 1.1 | 2.5 | — | 0.8 | 0.6 | — | — | bal. | 97.0 | 0.18 |
| 10 | 1.6 | 2.7 | — | 0.2 | 0.3 | — | — | bal. | 97.2 | 0.20 |
| 11 | 0.12 | — | 0.05 | — | — | — | — | bal. | 99.4 | 0.16 |
| 12 | 4.3 | — | 2.4 | — | — | — | — | bal. | 97.2 | 0.15 |
| 13 | 7.2 | 0.03 | 0.03 | — | — | — | — | bal. | 96.8 | 0.15 |
| 14 | — | 5.1 | 0.6 | — | 5.0 | — | 1.2 | bal. | 96.3 | 0.18 |
| 15 | — | 0.09 | 0.28 | — | — | — | — | bal. | 99.7 | 0.16 |
| 16 | — | 3.6 | 1.5 | — | — | — | — | bal. | 97.5 | 0.10 |
| 17 | — | 6.1 | 0.1 | — | — | — | — | bal. | 96.9 | 0.11 |
| 18 | — | 6.1 | 1.0 | — | 3.8 | — | 0.7 | bal. | 96.7 | 0.18 |
| 19 | 0.93 | 7.3 | 1.0 | — | — | — | — | bal. | 96.3 | 0.18 |
| 20 | 1.4 | 2.8 | 0.6 | 0.7 | 1.8 | — | 1.2 | bal. | 97.5 | 0.20 |

| samples | cutting tool material | | | | relative density (%) | flank wear width (mm) |
|---|---|---|---|---|---|---|
| | composition (wt. %) | | | | | |
| | BaO | MgO | CaO | diamond | | |
| comparative cutting tool | | | | | | |
| 1 | 0.02 | — | — | bal. | 99.7 | life time 25 min. by chipping |
| 2 | 15.2 | — | — | bal. | 95.3 | life time 20 min. by chipping |
| 3 | — | 0.03 | — | bal. | 99.6 | life time 25 min. by chipping |

TABLE 2-continued

| samples | BaCO₃ | MgCO₃ | CaCO₃ | CaMg(CO₃)₂ | diamond | relative density (%) | flank wear width (mm) |
|---|---|---|---|---|---|---|---|
| 4 | — | 14.8 | — | — | bal. | 94.8 | life time 20 min. by chipping |
| 5 | 4.3 | 10.7 | — | — | bal. | 95.1 | life time 25 min. by chipping |
| 6 | 12.4 | 3.5 | — | — | bal. | 95.3 | life time 25 min. by chipping |
| 7 | 4.1 | — | 7.2 | — | bal. | 96.2 | 0.35 |
| 8 | — | 3.7 | 6.3 | — | bal. | 96.7 | 0.30 |
| 9 | 1.9 | 4.9 | 5.8 | — | bal. | 96.3 | 0.32 |
| 10 | 1.9 | 2.9 | 6.5 | — | bal. | 96.7 | 0.43 |

| samples | BaCO₃ | MgCO₃ | CaCO₃ | CaMg(CO₃)₂ | diamond | relative density (%) | flank wear width (mm) |
|---|---|---|---|---|---|---|---|
| conventional cutting tool | | | | | | | |
| 1 | 0.13 | — | — | — | bal. | 99.7 | life time 20 min. by chipping |
| 2 | 5.2 | — | — | — | bal. | 99.8 | life time 15 min. by chipping |
| 3 | 10.2 | — | — | — | bal. | 99.8 | life time 15 min. by chipping |
| 4 | 15.0 | — | — | — | bal. | 99.9 | life time 10 min. by chipping |
| 5 | — | 0.12 | — | — | bal. | 99.6 | life time 20 min. by chipping |
| 6 | — | 6.4 | — | — | bal. | 99.9 | life time 20 min. by chipping |
| 7 | — | 9.7 | — | — | bal. | 99.9 | life time 15 min. by chipping |
| 8 | — | 19.7 | — | — | bal. | 99.9 | life time 10 min. by chipping |
| 9 | 2.5 | 10.2 | — | — | bal. | 99.7 | life time 15 min. by chipping |
| 10 | 2.5 | 6.0 | — | — | bal. | 99.8 | life time 10 min. by chipping |

What is claimed as new and desired to be secured by Letters Patent of the Unted States is:

1. A cutting tool made of a diamond-based ultra-high-pressure-sintered material having excellent chipping resistance, said material comprising from 0.05 to 13 wt % of at least one of barium oxide and magnesium oxide, and diamond which forms a matrix, said material having a theoretical density percentage of 96 to 99.5% and a structure wherein pores and said at least one of barium oxide and magnesium oxide are distributed throughout the diamond matrix.

2. A cutting tool made of a diamond-based ultra-high-pressure-sintered material having excellent chipping resistance, said material comprising at least one of barium oxide and magnesium oxide, calcium oxide, and diamond which forms a matrix, the total content of barium oxide and magnesium oxide being from 0.05 to 13 wt %, the content of calcium oxide being 0.02 to 5 wt %, said material having a theoretical density percentage of 96 to 99.5% and a structure in which pores and said content of at least one of barium oxide and magnesium oxide, and said calcium oxide, are distributed throughout the diamond matrix.

3. A method of manufacturing the cutting tool made of a diamond-based ultra-high-pressure-sintered material having excellent chipping resistance according to claim 1, said method comprising the steps of:

preparing a cutting tool blank formed of a material having a composition comprising 0.1 to 20wt % of at least one of barium carbonate and magnesium carbonate, and diamond which forms a matrix, said blank material having a structure in which said content of at least one of barium carbonate and magnesium carbonate are distributed in the diamond matrix, having a theoretical density percentage higher than 99.5%; and heating and maintaining the cutting tool blank at a temperature of 800° to 1400° C. in a pressure-reduced atmosphere so that the carbonates in the matrix are changed into oxides by chemical reaction, and so that pores distributed throughout the matrix are formed.

4. A method of manufacturing the cutting tool made of a diamond-based ultra-high-pressure-sintered material having excellent chipping resistance according to claim 1, said method comprising the steps of:

preparing a cutting tool blank formed of a material having a composition comprising of 0.1 to 20 wt % of at least one of barium carbonate and magnesium carbonate, and diamond which forms a matrix, said blank material also having a structure in which said content of at least one of barium carbonate and magnesium carbonate are distributed throughout the diamond matrix, said blank material also having a theoretical density percentage higher than 99.5%; and heating and maintaining the cutting tool blank at a temperature of 1000° to 1400° C. in a pressure-reduced atmosphere so that the carbonates in the matrix are changed into oxides by chemical reaction, and so that pores distributed throughout the matrix are formed.

5. A method of manufacturing the cutting tool made of a diamond-based ultra-high-pressure-sintered material having excellent chipping resistance according to claim 2, said method comprising the steps of:

preparing a cutting tool blank formed of a material having a composition comprising 0.1 to 20 wt % of at least one of barium carbonate and magnesium carbonate, 0.05 to 10 wt % of at least one of a composite carbonate of magnesium and calcium and calcium carbonate, and diamond which forms a matrix, said blank material having a structure in which said content of at least one of barium carbonate and magnesium carbonate is distributed in the diamond matrix, said blank material also having a theoretical density percentage higher than 99.5%; and heating and maintaining the cutting tool blank at a temperature of 800° to 1400° C. in a pressure-reduced atmosphere so that the carbonates in the matrix are changed into oxides by chemical reaction, and so that pores distributed throughout the matrix are formed.

6. A method of manufacturing the cutting tool made of a diamond-based ultra-high-pressure-sintered material having excellent chipping resistance according to claim 2, said method comprising the steps of:

preparing a cutting tool blank formed of a material having a composition comprising of 0.1 to 20 wt % of at least one of barium carbonate and magnesium carbonate, and 0.05 to 10 wt % of at least one of a composite carbonate of magnesium and calcium and calcium carbonate, and diamond which forms a matrix, said blank material also having a structure in which said content of at least one of barium carbonate and magnesium carbonate is distributed in the diamond matrix, said blank material also having a theoretical density percentage higher than 99.5%; and heating and maintaining the cutting tool blank at a temperature of 1000° to 1400° C. in a pressure-reduced atmosphere so that the carbonates in the matrix are changed into oxides by chemical reaction, and so that pores distributed in the matrix are formed.

7. A cutting tool made of a diamond-based, ultra-high-pressure-sintered material having excellent chipping resistance, said material consisting essentially of from 0.05 to 13 wt % of at least one of barium oxide and magnesium oxide, and diamond which forms a matrix, said material having a theoretical density percentage of 96 to 99.5% and a structure wherein pores and said at least one of barium oxide and magnesium oxide are distributed throughout the diamond matrix.

8. A cutting tool made of a diamond-based, ultra-high-pressure-sintered material having excellent chipping resistance, said material consisting essentially of at least one of barium oxide and magnesium oxide, calcium oxide, and diamond which forms a matrix, the total content of barium oxide and magnesium oxide being from 0.05 to 13 wt %, the content of calcium oxide being 0.02 to 5 wt %, said material having a theoretical density percentage of 96 to 99.5% and a structure in which pores and said content of at least one of barium oxide and magnesium oxide, and said calcium oxide, are distributed throughout the diamond matrix.

* * * * *

UNITED STATES PATENT AND TRADEMARK OFFICE
CERTIFICATE OF CORRECTION

PATENT NO. : 5,624,756
DATED : APRIL 29, 1997
INVENTOR(S) : FUMIHIRO UEDA ET AL

It is certified that error appears in the above-indentified patent and that said Letters Patent is hereby corrected as shown below:

Column 1, line 32, "Unfortunately,," should read --Unfortunately,--;
        line 61, "which larger" should read --which is larger--.

Column 3, line 57, "shogun" should read --shown--.

Signed and Sealed this

Twenty-eighth Day of July, 1998

Attest:

BRUCE LEHMAN

Attesting Officer        Commissioner of Patents and Trademarks